(12) United States Patent
Lofgren et al.

(10) Patent No.: US 6,770,004 B1
(45) Date of Patent: Aug. 3, 2004

(54) ELECTRICALLY CONDUCTIVE TIMING BELT

(75) Inventors: Jeffery Dwight Lofgren, Lincoln, NE (US); Frank Joseph Feuerborn, Lincoln, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/890,748

(22) PCT Filed: Mar. 26, 1999

(86) PCT No.: PCT/US99/06478

§ 371 (c)(1),
(2), (4) Date: Aug. 2, 2001

(87) PCT Pub. No.: WO00/58191

PCT Pub. Date: Oct. 5, 2000

(51) Int. Cl.[7] .................................. F16G 1/06
(52) U.S. Cl. ....................... 474/266; 474/264
(58) Field of Search ............... 474/263, 237, 474/260, 264, 266; 428/116, 61, 57, 58; 128/36.91; 399/184, 81, 160, 162; 525/185, 511, 186, 197

(56) References Cited

U.S. PATENT DOCUMENTS

| | | | | |
|---|---|---|---|---|
| 3,667,308 A | * | 6/1972 | Schwab et al. | ............. 474/263 |
| 4,256,249 A | * | 3/1981 | Konno et al. | ................. 226/181 |
| 4,392,177 A | | 7/1983 | Geyken | ....................... 361/221 |
| 4,606,955 A | * | 8/1986 | Eastman et al. | ............ 428/116 |
| 4,758,213 A | | 7/1988 | Tanaka et al. | ............... 474/264 |
| 4,767,389 A | | 8/1988 | Habegger et al. | ........... 474/266 |
| 4,823,942 A | | 4/1989 | Martin et al. | ................ 198/847 |
| 5,055,886 A | * | 10/1991 | Nakatani et al. | ............ 399/184 |
| 5,209,705 A | | 5/1993 | Gregg | ......................... 474/204 |
| 5,351,530 A | * | 10/1994 | Macchiarulo et al. | ....... 474/268 |
| 5,417,619 A | | 5/1995 | Tajima et al. | ............... 474/260 |
| 5,908,898 A | * | 6/1999 | Wan-Cheng et al. | ........ 525/185 |
| 5,966,573 A | * | 10/1999 | Yu et al. | ..................... 399/160 |
| 6,228,448 B1 | * | 5/2001 | Ndebi et al. | ................. 474/268 |
| 6,296,588 B1 | * | 10/2001 | Ciemniecki et al. | ........ 474/268 |

FOREIGN PATENT DOCUMENTS

| | | | | |
|---|---|---|---|---|
| EP | 0472436 | | 2/1992 | ............ B32B/5/28 |
| EP | 0 838605 A1 | * | 4/1998 | |
| GB | 2100390 | | 12/1982 | .......... F16C/13/00 |
| JP | 56-169810 A | * | 12/1981 | ................. 428/373 |
| JP | 58-89704 A | * | 5/1983 | ............ C08K/3/04 |
| JP | 58-176224 A | * | 10/1983 | ............ B05D/7/02 |
| JP | 08-160757 A | * | 6/1996 | |
| JP | 61-140640 A | * | 6/1996 | |
| JP | 10-207242 A | * | 8/1998 | |
| WO | 9747460 | | 12/1997 | ........... B29C/47/24 |

* cited by examiner

*Primary Examiner*—Marcus Charles
(74) *Attorney, Agent, or Firm*—Nancy T. Krawczyk

(57) ABSTRACT

An electrically conductive article (1) which maintains the conductive property over an extended use life is comprised of an electrically conductive thermoplastic layer (8) on the surface which is in contact with another article. When forming belts for synchronous drive systems, in addition to maintaining the electrical properties, the conductive layer exhibits high abrasion resistance and good tooth formation. A bonding layer (9) may be provided between the article body and the conductive layer (8).

7 Claims, 1 Drawing Sheet

ELECTRICALLY CONDUCTIVE TIMING BELT

TECHNICAL FIELD

The present invention is directed toward rubber articles with improved electrical conductivity. The invention has particular application for timing belts to obtain timing belts with improved electrical conductivity properties.

BACKGROUND ART

In devices that utilize rubber in conjunction with mechanical drive means, the movement of the belt relative to the other parts of the apparatus builds a static electrical charge on the belt. Other mechanical parts of the apparatus can also generate a static charge that may be transferred to the belt. In some applications, the presence of the static charge may damage sensitive electrical equipment. Static charge build-up also may limit the operating speed of the belt, thus limiting the operation speed of the device. By forming a conductive belt, the static charge is dissipated during movement, preventing a charge buildup that could lead to the generation of sparks or arcs. This also permits an increased operation speed.

A concern in forming conductive belts is maintaining the abrasion properties of the belt and the ability of the conductive material to bond and adhere with the other belt components. To that end, static conductivity in a belt has been obtained by numerous methods.

U.S. Pat. No. 4,823,942 discloses an electrically conductive belt comprising a layer of electrically conductive rubber containing conductive carbon black. Similarly, U.S. Pat. No. 4,758,213 discloses a composite belt with a layer of conductive rubber. The layer has 20 to 40 parts by weight of a conductive material selected from carbon black, metallic powder, metallic fibers, or conductive organic fibers. U.S. Pat. No. 4,767,389 discloses a driving belt reinforced with multi-functional threads, including electrically conductive filaments of metal or carbon fibers, providing the belt with anti-static properties. U.S. Pat. No. 5,417,619 discloses a v-ribbed belt with an outer rubber layer formed of a rubber composition including conductive carbon.

U.S. Pat. No. 4,392,177, GB 2,100,390, and WO 97/47460 disclose forming a roller with an outer thermoplastic layer. The roller of U.S. Pat. No. 4,392,177 and GB 2,100,390 disclose a metal roller with an outer layer of plastic material that contains pulverized metallic material to create a surface reistance. WO 97/47460 discloses a method of applying a layer of heat shrinkable polymer material onto a machinery roller.

However, when the belt is formed with an outer layer of thermoplastic with good insulation properties, such as polyethylene, known methods for providing electrical conductivity in the belt prove insufficient to yield the desired properties. The present invention is directed toward forming an electrically conductive belt wherein the composition of the outer thermoplastic layer is utilized to provide the desired physical probes, including electrical conductivity, adhesion, abrasion and flexibility for both operation and tooth formation.

Additionally, under current standards for "electrically conductive belts", it is only required that the belt have an initial ohm rating within a range that is determined to be electrically conductive. There is no set requirement that the belt maintain the electrical property after any period of belt life. The present invention is also directed toward a belt that can be made to maintain a desirable electrical conductivity during the life of the belt.

SUMMARY OF THE INVENTION

The present invention is a translational article including a material in the article that tends to build an electrical charge during normal use when in contact with a second article with which the article has relative movement. The translation article has a body and a cover layer on the innermost surface. The innermost surface is the article surface which contacts the second article. The cover layer of the inventive article is an electrically conductive thermoplastic.

Another aspect of the present invention is that the cover layer is ultra high molecular weight polyethylene.

Another aspect of the present invention is that the cover layer has a thickness within the range of 0.05 to 0.25 mm (0.002 to 0.01 inches).

In another aspect of the present invention a bonding layer may be provided adjacent the cover layer.

In another aspect of the invention, the article has an initial surface electrical resistance of not more than 0.05 M ohms.

In another aspect of the invention, the article is a belt. The belt may be of any conventional body construction, and may include any one or multiple conventional elements such as teeth, reinforcing tensile members, and reinforcing fabric.

BRIEF DESCRIPTION OF DRAWINGS

The invention will be described by way of example and with reference to the accompanying drawing in which.

DETAILED DESCRIPTION OF THE INVENTION

Figure 1:
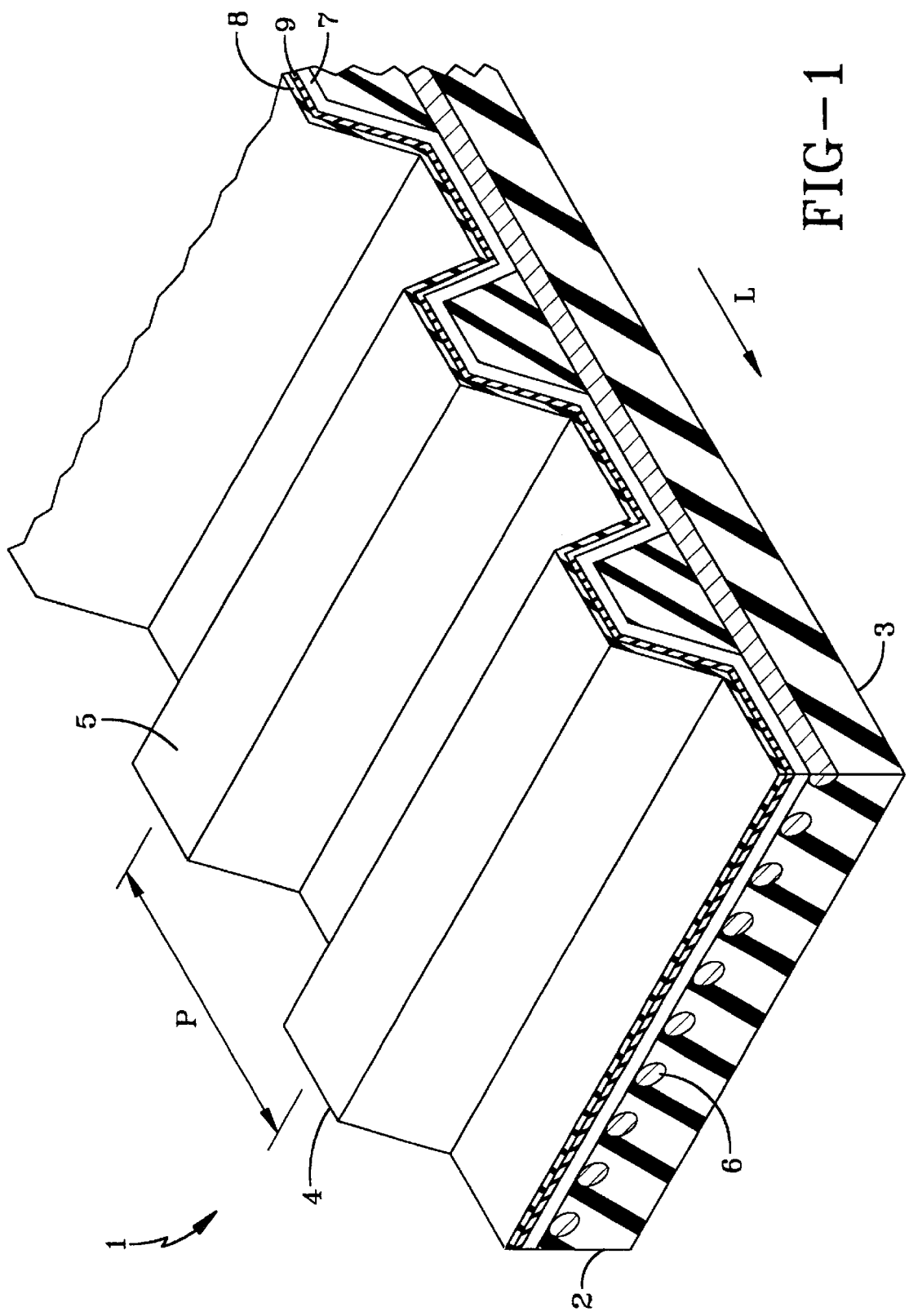
FIG. 1 illustrates a belt employing the present invention.

As illustrated in FIG. 1, the belt 1 has a belt body 2, with an outer surface 3, and an inner facing toothed surface 4. The inner facing surface 4 has at least one row of adjacent rows of teeth 5 and when the belt is used, it is the inner surface 4 which contacts another article to drive the belt. The belt body 2 is made of a resilient elastomer and preferably reinforced with longitudinal tensile members 6 that lie along the belt longitudinal direction L.

The elastomer for the belt body 2 may be any one of those known to be suitable for use in such belts, e.g., polychloroprene, polyurethane, BBR, IIR, IR, SBR, CSM, EPDM, other thermosets, thermoplastic elastomers and other polymer alloys. The tensile members 6 are usually made of a plurality of cords of a high elastic modulus. These cords may be made from glass fiber, carbon fiber, steel, polyester, nylon, high tenacity rayon, or preferably, polyamide. If the belt is to be used for automotive applications, the tensile members are typically made using glass fibers. The tooth surface 4 is reinforced with an abrasion resistance fabric 7.

The illustrated teeth 5 are uniformly spaced apart in the longitudinal direction L by a pitch length P, the pitch length extending from one tooth centerline to the adjacent tooth centerline. The teeth 5 may extend obliquely to the longitudinal direction L. When the teeth 5 are so inclined the oblique inclination angle of the teeth ranges from 15° to 45°.

The belt surface 4 may be defined by several adjacent rows of teeth 5. When the belt 1 is defined by plural rows of adjacent teeth 5, the centerlines of the transversely adjacent teeth may meet at the belt centerline, forming a conventional V-shaped, or herringbone, configuration. Alternatively, the centerlines of the transversely adjacent inclined teeth 5 may be offset from each other by a portion of the pitch length, as disclosed in U.S. Pat. No. 5,209,705.

The resistance of the belt 1 is defined by the following equation, as defined by ISO 9563:

$$\text{Maximum Resistance} = \frac{(6 \times 10^5) \times (\text{Length between electrodes})}{(\text{Width of the Belt})}$$

ISO 9563 testing of belts requires contacts that should cover the top of three belt teeth and all of two grooves. Using the ISO equation above, the maximum resistance for an 8 mm pitch belt, 32 mm wide, is 0.98 M ohm. RMA standards (RMA IP-3-3) specifies 6 M ohm as the maximum resistance value for a conductive belt.

The inner belt surface 4 has two layers of plastic which aid in rendering the belt electrically conductive. The cover layer 8 is an electrically conductive thermoplastic. Cover layer 8 must have good abrasion properties and be able to soften between 180° and 350° F. to allow for good tooth formation during molding of the belt. A preferred material for the conductive cover layer 8 is electrically conductive ultra high molecular weight polyethylene (UHMWPE). The resistance of the thermoplastic layer, prior to the formation of the laminated belt 1, should be at least as static conductive as the desired conductivity of the belt 1 after formation.

The thickness of layer 8 ranges from 0.002" to 0.01", preferably 0.004" to 0.008". If the layer 8 is too thick, it is difficult to form the belt teeth 5 at the standard operating temperature. In forming the belt 1, the conductive cover layer 8 may be applied to a belt carcass by either winding a wide continuos sheet over the carcass, or spirally winding a narrow width strip of the conductive thermoplastic. The layer 8 can also be bonded to the tooth fabric 7 prior to forming the belt.

Between the conductive layer 8 and the fabric layer 7 is a bonding layer 9. The bonding layer 9 assists in adhering the conductive layer 8 to the fabric layer 7. Because of its function, the bonding layer 9 is selected to be chemically similar to the conductive layer and have good adhesion characteristics with the underlying fabric layer 7. When the conductive layer 8 is UHMWPE, the preferred material for layer 9 is high density polyethylene HDPE. The HDPE has the ability to melt and "soak" into the fabric 7, providing a sufficient mechanical bond with the fabric 7, and it is able to chemically bond with the UHMWPE. The thickness of layer 9 ranges from 0.001" to 0.01", preferably 0.002" to 0.008".

The bonding layer 9 may be excluded if the conductive layer 8 can achieve a sufficient chemical and/or mechanical bond with the fabric layer 7. This may be accomplished by using such conventional adhesion promoters as a spray adhesive, or coating on the fabric 7.

EXAMPLE BELT 1

A belt 1 was made in accordance with the disclosed invention, wherein the conductive layer 8 was formed of conductive UHMWPE. The conductive UHMWPE is commercially available from UC Plastics. The conductive layer 8 was 0.004" thick, and no bonding layer was used.

EXAMPLE BELT 2

A belt 1 was made in accordance with the disclosed invention, wherein the conductive layer 8 was formed of conductive UHMWPE. The conductive layer 8 was 0.008" thick, and a bonding layer 9, 0.008" thick, was located between the conductive layer 8 and the fabric 7.

For both example belts, the UHMWPE layer, prior to application onto the belt body, had a resistance of 0.001 M ohms.

Comparison Belt

For comparison, a static conductive rated belt with a nylon cover coated with static conductive rubber was tested.

Each belt was run on a flex tester for the designated number of hours, and the resistance of each belt was measured at a defined time. The test data for the three belts is set forth in the following table. Resistance was measured by a surface resistance checker that meets ASTM standard D-257. The resistance checker employs two spaced metal bars, about 1⅞" apart, so that comparison can be made between different belts. Herein, all of the tested belts were the same length. Under this standard, a belt is conductive if the surface resistance is less than 100 M ohm, and resistant if over 100 M ohm.

TABLE 1

| Belt | Resistance, M ohm | | | |
|---|---|---|---|---|
| Hours Run | 0 | 100 | 200 | 300 |
| Example 1 | 0.01 | 0.05 | 0.05 | 0.05 |
| Example 2 | 0.01 | 0.01 | 0.01 | 0.01 |
| Conventional | 10 | 50 | 500 | 500 |

Example belt 1 had an initial stance of $10^4$ ohm. A resistance check at 100, 200, and 300 hours found the belt maintained a resistance of 0.05 M ohm.

Example 2 had an initial resistance of $10^4$ ohm. After running for 100, 200, and 300 hours, the belt 1 experienced no loss of conductivity. A final check at 700 hours showed no loss in resistance of the belt 1.

The comparison belt had an initial resistance of 10 M ohm. After running 100 hours, the belt had a resistance of 50 M ohm; after 200 and 300 hours, the resistance was 500 M ohm.

The belts constructed according to the present invention maintained either the original resistance or showed no significant loss of electrical conductivity. The comparison belt, one that is conventionally rated as electrically conductive, maintained a conductive rating for at least the first 100 hours, but over the longer belt life, the conductivity decreased.

As electrical conductivity is desired in synchronous belts to dissipate static charge, preventing charge buildups, and permit increased operational speed, this belt characteristic should ideally be maintained over a long belt life. The conventional elastomeric belt as electrically conductive does not maintain this property throughout the belt life, contrary to the belt 1 of the present invention. The inventive belt 1 has uses in both industrial and automotive applications.

The use of an electrically conductive thermoplastic bonded to rubber for the purpose of improved electrical conductivity is applicable to other rubber articles which tend to build up an electrical charge during normal use due to contact with another article. Such other articles include but are not limited to non-toothed belts, rubber rollers, printing blankets, photocopy belts, and other translational articles.

While certain representative embodiments and details have been shown for the purpose of illustrating the invention, it will be apparent to those skilled in this art that various changes and modifications may be made therein without departing from the spirit or scope of the invention.

It is, therefore, to be understood that changes can be made in the particular embodiments described which will be within the full intended scope of the invention as defined by the following appended claims.

What is claimed is:

1. A power transmission belt (1) including a material in the belt that tends to build an electrical charge during normal use when in contact with another article with which the belt has relative movement, the belt (1) comprising a body (2) and a cover layer (8) on an innermost surface (4) intended to be in contact with the another article, the belt (1) being characterized by the innermost surface (4) having at least one row of adjacent rows of teeth (5), and the cover layer (8) being an electrically conductive polyethylene thermoplastic.

2. The belt (1) in accordance with claim 1 wherein the cover layer (8) is ultra high molecular weight polyethylene.

3. The belt (1) in accordance with claim 1 or 2 wherein the thickness of cover layer (8) is within the range of 0.05 to 0.25 mm (0.002 to 0.01 inches).

4. The belt (1) in accordance with claim 1 or 2 wherein a bonding layer (9) is adjacent the cover layer (8).

5. The belt (1) in accordance with claim 4 wherein the bonding layer (9) is high density polyethylene.

6. The belt (1) in accordance with claim 1 wherein the belt (1) has an initial surface electrical resistance of not more than 0.05 M ohms.

7. The belt (1) in accordance with claim 1 wherein the belt (1) comprises a fabric layer (7) adjacent the cover layer (8).

* * * * *